(12) United States Patent
Fadler et al.

(10) Patent No.: US 7,485,059 B2
(45) Date of Patent: Feb. 3, 2009

(54) TWO PIECE STAMPED STEEL PULLEY

(75) Inventors: Richard J. Fadler, St. Charles, MO (US); Loren A. Ahaus, Kirkwood, MO (US); Jeffrey K. Leicht, Cleveland, WI (US)

(73) Assignee: Emerson Electric Co., St. Louis, MO (US)

( * ) Notice: Subject to any disclaimer, the term of this patent is extended or adjusted under 35 U.S.C. 154(b) by 1241 days.

(21) Appl. No.: 10/227,096

(22) Filed: Aug. 23, 2002

(65) Prior Publication Data

US 2003/0008741 A1 Jan. 9, 2003

Related U.S. Application Data

(63) Continuation-in-part of application No. 09/669,144, filed on Sep. 26, 2000, now abandoned.

(51) Int. Cl.
*F16H 55/36* (2006.01)
(52) U.S. Cl. .................................................. 474/166
(58) Field of Classification Search ......... 479/166–174, 479/180–183; 228/245, 254
See application file for complete search history.

(56) References Cited

U.S. PATENT DOCUMENTS

| 414,972 | A | 11/1889 | Case |
| 516,398 | A | 3/1894 | Moore |
| 610,724 | A | 9/1898 | Rocholl |
| 859,099 | A | 7/1907 | Nice, Jr. |
| 1,606,175 | A | 11/1926 | Olinger |
| 3,105,709 | A | * | 10/1963 | Hanke ..................... 403/219 |
| 3,618,411 | A | 11/1971 | Rottweiler |
| 3,822,457 | A | * | 7/1974 | Frost et al. ............... 29/892.11 |
| 3,898,888 | A | 8/1975 | Frost et al. |
| 4,016,770 | A | 4/1977 | Enters |
| 4,496,336 | A | 1/1985 | Matsumoto |
| 5,454,760 | A | 10/1995 | Aranibar |

FOREIGN PATENT DOCUMENTS

| DE | 2208499 | 8/1973 |
| FR | 2550598 A1 | 7/1985 |
| GB | 2078905 A | 1/1982 |
| JP | 52-34159 | 3/1977 |
| JP | 56-18159 | 2/1981 |

* cited by examiner

*Primary Examiner*—Vicky A Johnson
(74) *Attorney, Agent, or Firm*—Thompson Coburn LLP; Joseph M. Rolnicki, Esq.

(57) ABSTRACT

A pulley is provided with first and second disks each having an outer surface and an inner surface, and a center hole with a center axis. Each disk has a hub formed at its center hole that extends outwardly from the disk outer surface. The inner side of each disk has a drive surface and a connection surface extending around its respective center hole. The connection surface is perpendicular to the center axis and the drive surface is angled relative to the connection surface to form the outer surface of each disk with a generally concave shape. The connection surfaces of the first and second disks are abutted and secured together using a fastening mechanism. The disks are arranged where the drive surfaces form an annular groove around the hubs and the hubs of each disk are aligned concentrically with the groove.

8 Claims, 4 Drawing Sheets

TWO PIECE STAMPED STEEL PULLEY

This patent application is a continuation-in-part of patent application Ser. No. 09/669,144 titled "Two Piece Stamped Steel Pulley," filed Sep. 26, 2000 and now abandoned.

BACKGROUND OF THE INVENTION (1) Field of the Invention

This invention pertains to a pulley commonly used in consumer appliances, such as washing machines and dishwashers. Specifically, the invention pertains to a novel design of the pulley and a method of making the same.

(2) Description of the Related Art

Pulleys are commonly found in many applications where the rotary motion between two shafts is coupled together through a pulley and belt system. Many consumer appliances, such as washing machines and dishwashers, commonly have several pulleys in their drive systems to transfer the rotary motion of the drive motor to pumps, transmissions, and other devices requiring power coupled from the motor. Because of mass production of these consumer appliances, the number of pulleys required in production is also relatively high. In order to reduce costs of production, manufacturers have focused their cost savings efforts on large volume items such as pulleys where small improvements are often multiplied through volume into considerable savings.

Conventionally, pulleys in these applications are typically metal and machined to the desired geometry. Generally, bar stock is the raw material for such production and through sequential turning, boring, grooving, and cut-off operations, the pulleys are produced. However, pulleys produced from this type of machining are expensive since the machining operations for forming a pulley generally have long cycle times and tend to generate high percentages of scrap. In forming a pulley in this manner, a large majority of the bar stock material must be machined away to achieve the final desired pulley shape and design. Generally speaking, this process does not efficiently use the raw material since a large portion of the material is machined away as chips. The center hub of the pulley must be precision formed so that it may fit on the motor shaft with minimal slip and rotate about the motor shaft with minimal run out. Often this requires secondary operations and increased inspection to ensure the required levels of concentricity and dimensional accuracy are met. Additionally, bar stock is a relatively expensive form of material, and pulleys formed from bar stock tend to be rigid such that they are harder to install in the appliance.

Some manufacturers have attempted to use plastic pulleys in these applications because plastic raw materials are less expensive than metal forms of material and plastic pulleys may be formed in low cost, high speed, injection molding processes. However, plastic pulleys formed in this manner often have strength and wear problems in these applications such that their use is limited.

In order to decrease the number of manufacturing operations associated with the production of conventional metallic pulleys, manufacturers have produced pulleys as three-piece assemblies. In this design, the pulley has a center hub formed from a sintered powdered metal material. The hub has a precision center hole formed in it to allow the hub to be mounted on the shaft. To form the body of the pulley, circular pieces of sheet stock typically are stamped to create a general concave form. The two circular pieces of sheet stock are arranged side by side on the hub. The pieces are secured to the hub commonly through a brazing operation. The use of stamped flat sheet stock blanks eliminates much of the waste previously found when machining bar stock.

Although the three-piece pulley has many advantages over the machined pulley, the three-piece pulley also has many drawbacks. The powdered metal sintered hub is expensive to form and the center hole must be extruded and reamed to the required dimensions to fit on the shaft with minimal slip. Similarly, the stamped pieces must be attached to each other around the hub in a concentric arrangement with the hub to minimize circular run out therewith. Additionally, the assembly operation associated with arranging the pieces around the hub is time consuming and costly, and an inventory of circular pieces and hubs must be maintained in the proper ratios to maintain efficient production on assembly lines.

To further decrease the number of manufacturing operations associated with the production of conventional metallic pulleys, manufacturers have produced pulleys as two-piece assemblies. In this design, two circular metallic plates are each stamped into the configuration of one half of a pulley assembly. Each plate when stamped is formed with one half of the cylindrical center hub of the pulley, a flat annular connection surface surrounding the center hub and projecting radially outwardly from the center hub, and an annular angled drive surface surrounding the connection surface and oriented at an angle relative to the connection surface giving the stamped half of the pulley a general dish shape. The two pulley halves are brought together by connecting their connection surfaces. Various different means were employed in connecting the connection surfaces of the two stamped pulley halves, including mechanical connectors such as rivets, bent tab in slot connections, and clinch joints. The two stamped halves of the pulley have also been joined together by welding.

However, since the filing of the parent application it has been observed that many of the mechanical fastener connections between the two stamped pulley halves do not work well in an environment where the pulley is rotated by a belt wrapped around the pulley. The tension on the belt wrapped around the pulley exerts an axial force component against the pulley drive surfaces that pushes the two pulley halves apart from each other. Where the two pulley halves are attached by mechanical fasteners, and in particular where the fasteners are tabs formed on each of the pulley halves that are inserted through slots in the other pulley half and bent over, the axial force tends to straighten the bends in the tabs causing the two pulley halves to be separated from each other resulting in a failure of the pulley.

What is needed is a metallic pulley which may be manufactured by a cost effective method. Such a pulley would be assembled in fewer operations, require fewer parts, and use less expensive materials. Such a pulley would be manufactured with less scrap and quality issues than those pulleys in the prior art. Moreover, such a pulley would be more easily installed in the appliance. These benefits would result in a lower cost pulley which would reduce the overall cost of manufacturing the appliance.

SUMMARY OF THE INVENTION

The pulley of the present invention reduces manufacturing and quality costs associated with the production of pulleys. The pulley of the present invention uses less expensive raw materials, requires fewer manufacturing operations, and uses fewer parts. The pulley of the present invention provides an inexpensive but durable pulley for the drive mechanisms of a consumer appliance to reduce the cost of the appliance.

The pulley of the present invention has first and second monolithic disks, each with an outer side and an inner side, and a center hole with a center axis through the sides. The outer side of each disk has a hub formed at the center hole that extends outward and away from the outer side. The inner side of each disk has a drive surface and a connection surface extending around its center hole. The connection surface is perpendicular to the center axis and the drive surface is angled relative to the connection surface to form a dish shape with the outer side of each disk having a generally concave aspect. The outer peripheral edge of each disk is formed with an annular, outwardly projecting lip or rim. The annular lip or rim provides hoop strength to the disk and a smooth edge at the pulley periphery that will not cause wear to the belt in use of the pulley. The connection surface of each disk is abutted and the disks are secured together using at least two fastening mechanisms. In this arrangement, the drive surfaces of each disk form an annular groove and the hubs of each disk are aligned concentrically with the groove.

The fastening mechanisms attach the first and second disks at the connection surface. Preferably, the two fastening mechanisms employed include a mechanical connection between the pulley halves that holds the halves together while brazing or spot welds are applied between the connection surfaces of each disk. For the mechanical connections of the invention, the connection surface of each disk may be formed with a plurality of matching circumferentialy spaced holes. In this arrangement, mechanical fasteners such as rivets may be inserted through the holes to secure the disks together. In an alternate embodiment, the disks may be secured together using a clinch joint between the connection surfaces of the disks. In a further alternate embodiment of the invention, the disks may be secured together by interposing a brazing material between the connection surfaces of the first and second disks. The brazing material may be used alone to secure the disks together or in combination with any the other previously mentioned methods.

By using stamped steel disks in the manufacture of the pulley of the present invention, the number of critical parts used in the manufacture of the pulley is minimized. The pulley formed in this manner provides a simpler method of manufacture that incorporates less operations and less assembly. By eliminating the operations and parts, the quality costs associated with the manufacture of conventional pulleys may be reduced.

BRIEF DESCRIPTION OF THE SEVERAL VIEWS OF THE DRAWINGS

Further objects and features of the invention are revealed in the following detailed description of the preferred embodiment of the invention and in the drawings, wherein.

Corresponding reference numbers indicate corresponding parts throughout the several views of the drawings.

DETAILED DESCRIPTION OF THE PREFERRED EMBODIMENT

Figure 1:
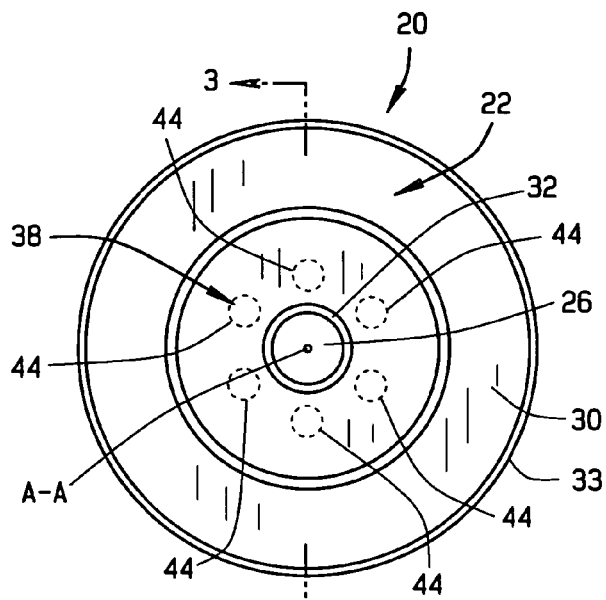
FIG. 1 is a front elevation view of a pulley of the present invention.
Figure 3:
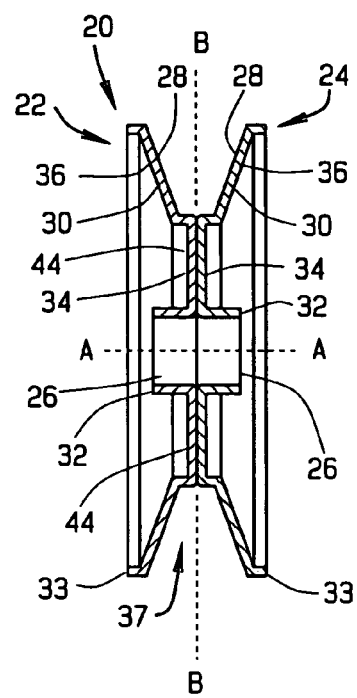
FIG. 3 is a side cross-sectional view of the pulley along line 3-3 of FIG. 1.
Figure 2:
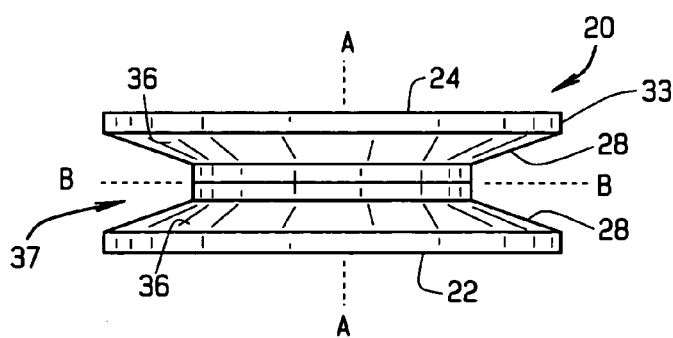
FIG. 2 is a top plan view of the pulley of FIG. 1.
Figure 4:
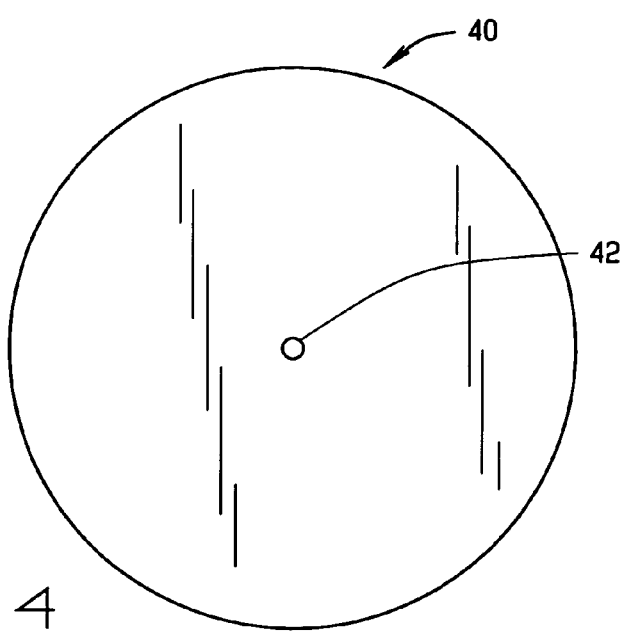
FIG. 4 is a front elevation view of a blank used to make the pulley of FIG. 1.

FIGS. 1-3 show the general arrangement of a pulley 20 of the present invention. The pulley 20 has first and second identical disks 22,24 positioned in a side-by-side arrangement and attached together to form the pulley 20. Each of the disks 22,24 has a center hole 26, and a center axis A-A through the center hole 26 about which the disk rotates when formed into the pulley 20. Each of the disks has an inner side surface 28 and outer side surface 30. For this description, the outer side 30 is that side of the disk exposed from the pulley when the disks 22,24 are arranged side-by-side, and the inner side 28 is that side of each disk placed adjacent each other when the disks 22,24 are arranged side-by-side.

In the area surrounding the center hole 26, each of the disks 22,24 has a cylindrical hub 32 that is concentric with the disk center hole 26 and center axis A-A. The hub 32 extends outward and away from the outer side 30 of each respective disk along the disk center axis A-A. The outer peripheral edge of each disk is formed with an annular, outwardly projecting lip or rim 33 that is concentric with the disk center hole 26 and center axis A-A. The lip or rim 33 extends outwardly and away from the outer side surface 30 of each disk and provides hoop strength to the disk as well as a smooth edge at the disk periphery that will not cut or wear down a belt wrapped around the pulley in use. Each of the disks 22,24 has a flat, circular connection surface portion 34 that extends around the hub 32 and is perpendicular to the center axis A-A. Each of the disks 22,24 has an annular drive surface portion 36 that extends at an oblique angle relative to the center axis A-A around the connection surface portion 34. Thus, the orientation of the drive surface portion 36 to the connection surface portion 34 and the center axis A-A gives the outer side 30 of each of the disks 22,24 a dish shape with a generally concave aspect except for the center hub 32 that extends away from the outer side 30. When the disks 22,24 are placed side-by-side, the drive surface portions 36 create an annular groove 37 about the hubs 32 for the pulley 20 to accept a typical V-Belt. Although the drive surface portions 36 are shown to be angled in the Figures, the drive surface portions 36 of the disks may be formed in any other shape so that the annular groove 37 matches the cross-sectional geometry of the belt used in the application. A fastening mechanism 38 is provided on the pulley 20 between the connection surface portions 34 of each disk to join the disks 22,24 together.

In order to reduce the number of parts associated with the manufacturing and assembly of the pulley 26, each of the disks 22,24 of the pulley 20 is preferably formed monolithically with the hub 32. Similarly, the outer annular lips or rims 33, the connection surface portions 34 and drive surface portions 36 of each disk are formed monolithically. The disks 22,24 are preferably formed from circular stock blanks 40 with a center starter hole 42 formed therein as shown in FIG.

4. Each blank 40 may then be stamped into the required geometry shown in FIGS. 1-3 with a connection surface portion, drive surface portion, an annular rim and hub formed together from a single piece of material. Preferably, cold rolled steel in sheet stock form is used as a material for the blank 40 because it is relatively inexpensive and deforms easily in many punch press machines. Preferably, the center starter hole 42 is sized to allow deformation of the blank 40 to form the center hub 32 at a suitable axial length from the outer side surface 30 of the respective disk to allow stability of the pulley 20 on a shaft of the appliance in which the pulley 20 of the present invention is used. The center starter hole 42 is also sized to allow deformation of the blank 40 to form the center hole 26 at a proper diameter to allow the pulley 20 to be received on the shaft in the appliance.

In order to form the pulley 20, each disk is stamped into the desired shape with a flat connection surface portion 34, a center hub extending perpendicularly outward from the outer side surface 30, an annular rim 33 extending perpendicularly outward from the outer side surface 30, and a drive surface portion 36 extending around the connection surface portion 34 concentric with the center hub 32. When assembling each of the disks 22,24 in a side-by-side arrangement to form the pulley 20, the inner sides 28 of each disk are aligned face-to-face with the connection surface portions 34 abutted. Prior to securing the disks 22,24 together with the fastening mechanism 38, the hubs 32 of each disk are aligned co-axially along the disk center axis A-A. Preferably, when the hubs are aligned co-axially along the disks center axes A-A, the annular groove 37 has minimal run out with the disks center axes A-A and the hubs 32, and the annular groove 37 is symmetric about a plane B-B defined by the connection surface portions 36. Preferably, the center hole 26 of each disk has a diameter that is substantially the same in order to allow the shaft upon which the pulley 20 rotates to be easily received in the center hole 26 of each disk with minimal slip and interference during installation in the appliance.

In order to join the first and second disks 22,24 together, the fastening mechanism 38 is provided. As shown in FIGS. 1 and 3, in a first embodiment the fastening mechanism 38 includes a plurality of spot welds 44 between the connection surface portions 34 of each disk. Preferably, the spot welds 44 are circumferentialy spaced around the center hub 32 and do not distort the perpendicularity of the connection surface portion 34 relative to the center axis A-A or the flatness of the connection surface portion 34 relative to the plane B-B.

Figure 5:
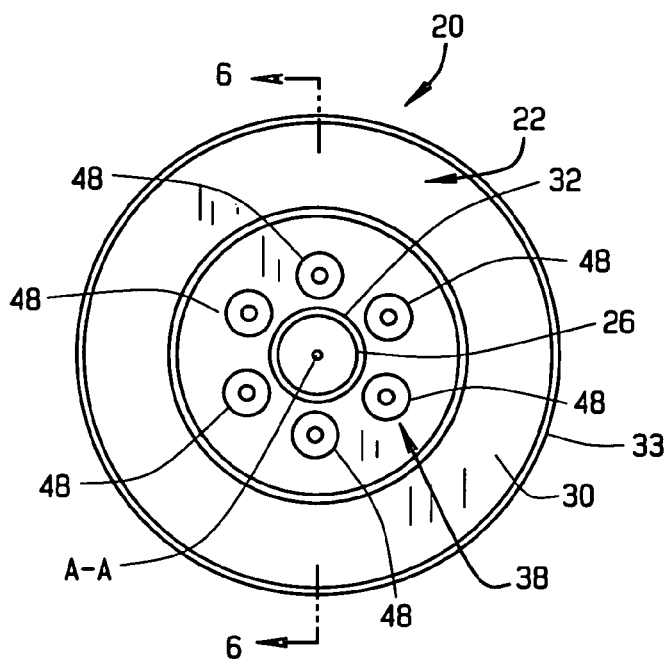
FIG. 5 is a front elevation view of an alternate embodiment of the pulley of FIG. 1.
Figure 6:
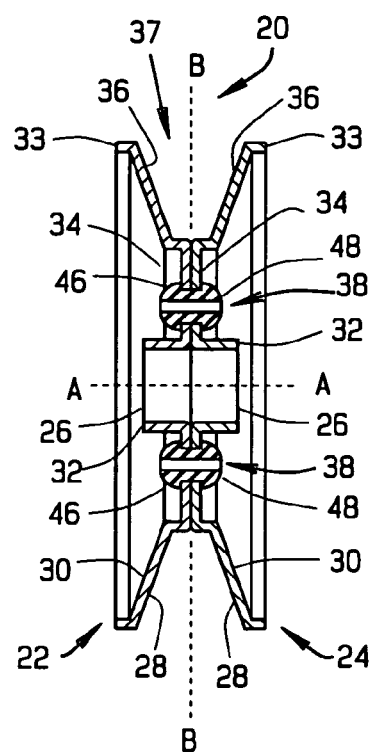
FIG. 6 is a side cross-sectional view along line 6-6 of FIG. 5.

An alternate embodiment of the pulley 20 of the present invention is shown in FIGS. 5 and 6. In this arrangement, the fastening mechanism 38 includes a plurality of circumferentialy spaced fastener holes 46 provided on the connection surface portion 34 of each disk and a plurality of mechanical fasteners 48, such as rivets. The fastener holes 46 on each of the disks 22,24 are spaced about the center hub and match with each other when the hubs 32 are aligned co-axially with the disks center axes A-A. The mechanical fasteners 48 are received in each fastener hole 46 to join the disks 22,24 together.

Figure 7:
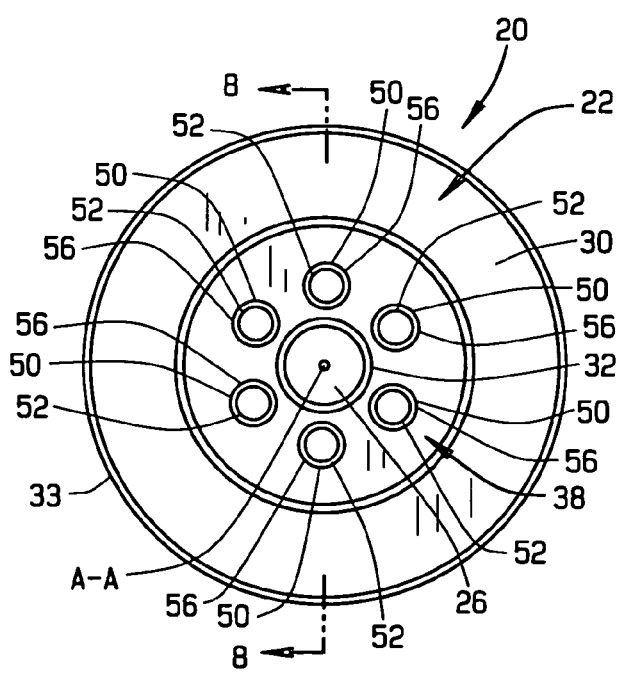
FIG. 7 is a front elevation view of an alternate embodiment of the pulley of FIG. 1.
Figure 8:
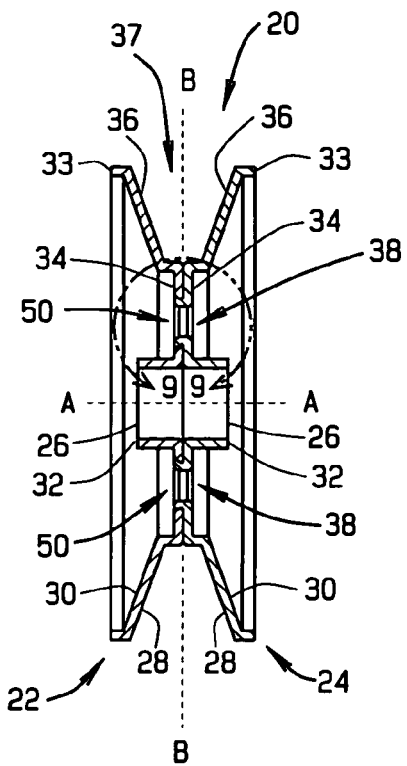
FIG. 8 is side cross-sectional view of the pulley along line 8-8 of FIG. 7.
Figure 9:
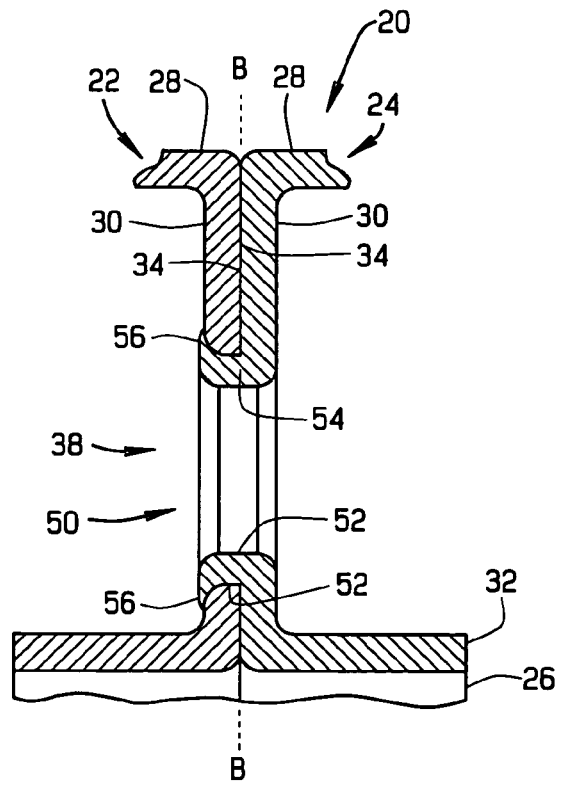
FIG. 9 is a partial, enlarged view of the detail of the area 9-9 of FIG. 8.

FIGS. 7 and 8 show an alternate embodiment of the pulley 20 of the present invention where the fastening mechanism 38 includes a clinch joint 50 formed between the connection surface portions 34 of each disk. To facilitate formation of the clinch joint 50 between the disks 22,24, a plurality of connection holes 52 are provided in the connection surface portion 34 of each disk circumferentialy spaced about the hub 32. Through a coining operation on punch press machinery, a portion of the connection surface portion 34 of the second disk 24 in the area adjacent each of the connection holes 52 is deformed into a tube-like projection 54 that extends away from the inner side 28 of the second disk 24. Simultaneously, as the tube-like projection 54 on the second disk 24 is formed, the tube-like projection 54 is received in the matching connection hole 52 on the first disk 22. This step deforms the matching connection hole 52 on the first disk 22 and stakes the disks 22,24 together. FIG. 9 provides greater detail of the clinch joint 50. Preferably, the tube-like projection 54 extends through the first disk connection hole 52 and out beyond the first disk outer side surface 30. The tube-like projection 54 is radially deformed outward into a flare 56 that engages the first disk outer side surface 30 in the area surrounding the matching first disk connection hole 52. This arrangement provides additional strength for the clinch joint and tightly secures the disks 22,24 together to form the pulley 20.

Figure 10:
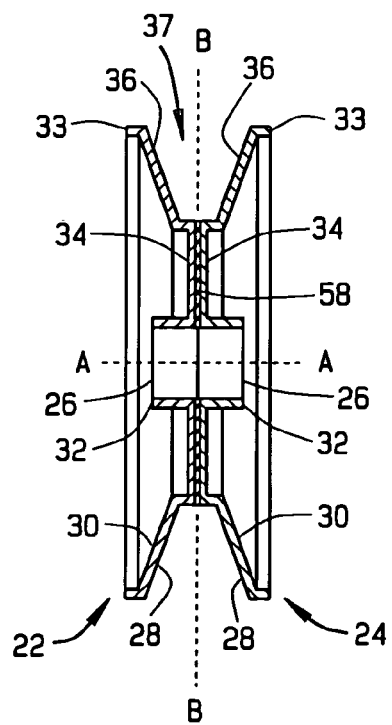
FIG. 10 is a side cross-sectional view of an alternate embodiment of the pulley of FIG. 3.
Figure 11:
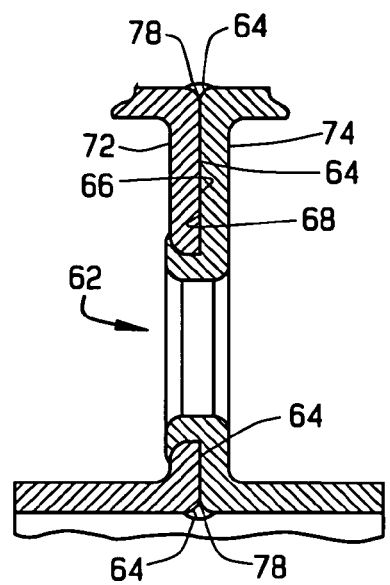
FIG. 11 is a partial enlarged view of the detail of the pulley of FIG. 10.

In an alternate embodiment of the pulley 20 of the present invention shown in FIG. 10, the first and second disks 22,24 are joined together by a brazing material 58 interposed between the connection surface portions 34 of the first and second disks 22,24. By heating the pulley, the brazing material or solder forms a metallurgical bond between the two disks 22,24, thus joining the disks 22,24 together. Brazing in this manner may be done in a batch furnace operation with minimal fixturing of the pulley 20 to maintain the alignment of the hubs about the disks center axes A-A and maintain symmetry of the annular groove 37 about the plane B-B. A copper braze is preferably used since it is compatible with the steel materials used for the disks 22,24 and does not corrode in industrial and commercial environments. Brazing in combination with any one of the other methods previously discussed may also be used to provide greater mechanical integrity to the pulley 20. For example, FIG. 11 shows a modification to the pulley of FIG. 10 where a clinch joint 62 is used in combination with brazing material 64 between the connection surfaces 66, 68 of two pulley disks 72, 74 in forming the pulley of the invention. In manufacturing this embodiment of the pulley, the clinch joints 62 are formed between the two pulley disks 72, 74 in the manner previously described with the brazing material 64 between the two disk connection surfaces 66, 68. Thus, the clinch joints 62 function to hold the two pulley disks 72, 74 while the disks are brazed together. Following the connection of the two pulley disks 72, 74 with the brazing material 64 interposed between the disks, the disks are brazed in a manner previously discussed. Alternatively, the two pulley disks 72, 74 could be first connected together by the clinch joints 62 formed between the two disks, and then the interior seam 76 in the pulley hub and the exterior seam 78 in the pulley annular groove could be brazed or welded together with the brazing material filling the seams.

In still further embodiments of the pulley, the other mechanical connections described herein may be used instead of the clinch joint 62 in combination with the brazing material holding the two pulley disks together.

Figure 12:
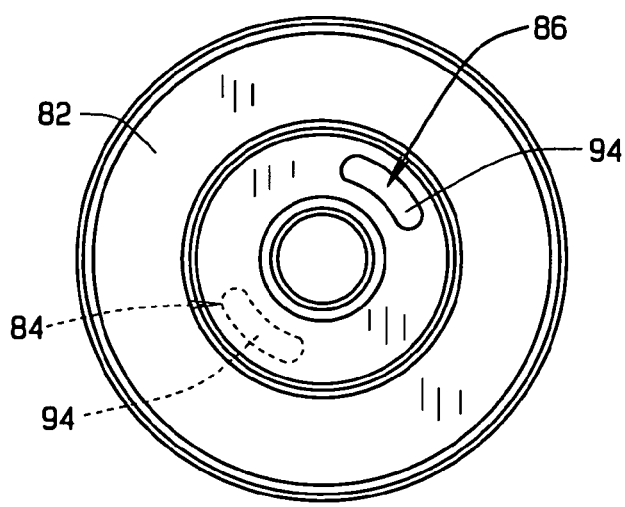
FIG. 12 is a front elevation view of a further embodiment of the pulley of the present invention.
Figure 13:
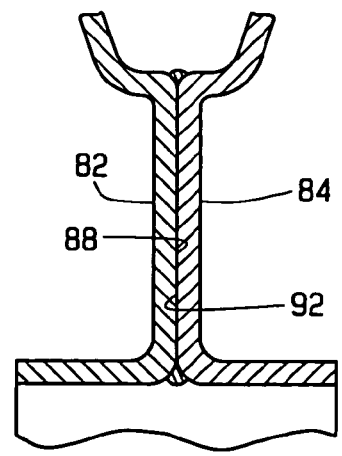
FIG. 13 is a partial, enlarged view of the detail of the pulley of FIG. 12.

In a still further embodiment of the pulley disclosed in FIGS. 12 and 13, the two pulley disks 82, 84 are formed in the same manner as the previously described embodiments, but with a slot 86 located in the connection surface 88, 92 of each pulley disk. The slot 86 formed in each connection surface 88, 92 is filled with a copper braze slug 94. Thus, in this embodiment of the invention it is not necessary to provide the brazing material separate from the two pulley disks. The brazing material is provided with each pulley disk in the slot of the disk. The previously formed disks are positioned side by side with their connection surfaces 88, 92 in engagement and the slugs 94 on opposite sides of the center axis, and the pulley is heated forming the brazed connection between the two pulley disks 82, 84. As a further variation to this embodiment, the two pulley disks 82, 84 with their slots 86 filled with brazing material could also be joined together by one of the mechanical connections between the two pulley disks previously described. The mechanically joined disks would then be heated to add the brazing material connection between the disks.

Various other changes to the preferred embodiment of the invention described above may be envisioned by those of ordinary skill in the art. However, those changes and modifications should be considered as part of the invention which is limited only by the scope of the claims appended hereto and their legal equivalents.

What is claimed is:

1. A pulley comprising:
a first disk and a second disk, each disk having an interior surface and an opposite exterior surface, each disk having a center hole with a center axis, each disk having a flat connection surface on the interior surface of the disk that extends around the center hole, each disk having a drive surface that extends around the connection surface and is oriented at an angle relative to the connection surface, the connection surface of the first and second disks being secured together by a brazing material interposed between the first and second disks, and the first and second disks each having a slot in the connection surface that contained the brazing material and the slots of the first and second disks do not axially oppose each other.

2. The pulley of claim 1, further comprising:
the first and second disks each having a cylindrical center hub that extends around the center hole with the hub, the connection surface and the drive surface of each disk being one monolithic piece.

3. The pulley of claim 2, further comprising:
the hub, the connection surface and the drive surface of each disk having been formed from a singled stamped circular piece of metal.

4. The pulley of claim 1, further comprising:
the first and second disks being the same.

5. The pulley of claim 1, further comprising:
the connection surfaces of the first and second disks also being secured together by at least one clinch joint.

6. The pulley of claim 1, further comprising:
the connection surfaces of the first and second disks also being secured together by a plurality of clinch joints.

7. A pulley comprising:
a first disk and a second disk, each disk having an interior surface and an opposite exterior surface, each disk having a center hole with a center axis, each disk having a flat connection surface on the interior surface of the disk that extends around the center hole, each disk having a drive surface that extends around the connection surface and is oriented at an angle relative to the connection surface, the connection surface of the first and second disks being secured together by a brazing material interposed between the first and second disks, and the first and second disks each having a slot in the connection surface that contained the brazing material and the slots of the first and second disks do not axially oppose each other; and,
the connection surfaces of the first and second disks also being secured together by at least one clinch joint.

8. The pulley of claim 7, further comprising:
the connection surfaces of the first and second disks also being secured together by a plurality of clinch joints.

* * * * *